United States Patent [19]

Carson

[11] Patent Number: 5,562,556
[45] Date of Patent: Oct. 8, 1996

[54] CONTINUOUS CABLE ROTARY DRIVE APPARATUS

[76] Inventor: Donald G. Carson, 12108 Towner Ave, NE., Albuquerque, N.M. 87112

[21] Appl. No.: 431,669

[22] Filed: May 2, 1995

[51] Int. Cl.[6] .................................................. F16H 7/00
[52] U.S. Cl. .................................................. 474/62; 474/66
[58] Field of Search ................................ 474/7, 62–67; 74/89.2, 89.22

[56] References Cited

U.S. PATENT DOCUMENTS

| | | | |
|---|---|---|---|
| 3,403,474 | 10/1968 | Spasoff | 74/89.22 X |
| 3,491,603 | 1/1970 | Harris | 74/89.22 X |
| 3,804,370 | 4/1974 | Woodard | 74/89.22 X |
| 4,351,197 | 9/1982 | Carson | 74/89.22 |
| 4,757,723 | 7/1988 | Carson | 74/89.2 |
| 4,787,259 | 11/1988 | Carson | 74/89.2 |
| 4,796,478 | 1/1989 | Carson | 74/89.2 |
| 4,957,014 | 9/1990 | Burke | 74/89.22 |
| 5,102,373 | 4/1992 | Martinson et al. | 474/101 |
| 5,105,672 | 4/1992 | Carson et al. | 74/89.22 |

*Primary Examiner*—Roger J. Schoeppel
*Attorney, Agent, or Firm*—Richard A. Bachand; Holland & Hart LLP

[57] ABSTRACT

A rotary drive apparatus has a drum with a first plurality of generally parallel grooves spaced a predetermined distance apart. A capstan adjacent the drum has a second plurality of generally parallel grooves spaced the same predetermined distance. The capstan may be disposed adjacent the drum with its grooves disposed between the grooves on the drum. The drum and the capstan may have parallel axes of rotation. A continuous cable in the grooves of the drum and the capstan couples the drum and the capstan for joint rotation. A pulley and spring adjacent the capstan tension the continuous cable.

34 Claims, 1 Drawing Sheet

CONTINUOUS CABLE ROTARY DRIVE APPARATUS

BACKGROUND OF THE INVENTION

1. Field of the Invention

This invention relates to improvements in rotary drive apparatuses and, more particularly, to improvements in rotary drive apparatuses in which an endless or a continuous cable is connected to both a driving member and a driven member.

2. Relevant Background

U.S. Pat. No. 4,351,197 (Carson) discloses a rotary drive apparatus in which a driving member or element, a screw, is coupled by a cable to a driven element, a drum. The screw is in turn coupled to an electric motor. Rotation of the screw results in rotation of the drum. The cable is terminated at both ends on the drum, and is arranged between the drum and the screw to transmit the driving force of the rotating screw to the drum. More particularly, the cable is connected at one end to the drum by a tensioning device. The cable is then threaded back and forth a number of times between grooves in the outside cylindrical wall of the drum and corresponding helical grooves in the outside cylindrical wall of the screw. The cable is then connected again at its terminating end to the drum. There may be a substantial difference in the diameters of the drum and the screw to enable a single rotation of the screw to produce a relatively small angular movement of the drum. This relationship allows a load on the driven member to be positioned with substantial accuracy or precision.

U.S. Pat. No. 4,757,723 (Carson) discloses a rotary drive apparatus in which a cable is coupled between a driving member and a driven member with both ends of the cable terminated in the driven member. Both ends of the cable, which couples the two members together, are connected to springs, which maintain a tension on the cable.

U.S. Pat. No. 4,787,259 (Carson) discloses a rotary drive system in which a single driven member is coupled to a plurality of driving members. One end of the cable is terminated in a spring to maintain tension on the cable. The other end of the cable is disclosed as being hard terminated, or fixed within the driven member.

U.S. Pat. No. 4,796,478 (Carson) discloses a rotary drive apparatus designed to provide nonlinear rotation by using a pivoting arm secured to the driving member and a driven member having an axis of rotation offset from its geometric center. A pair of cables is illustratively used in the apparatus, with the ends of the cables being terminated in the driven member.

U.S. Pat. No. 5,105,672 (Carson et al.) discloses a rotary drive apparatus in which one of two rotating members, either the driving member or the driven member, includes a smooth outer surface. Multiple cables are shown, with the cables being terminated on the driven member.

Since each of the above apparatuses disclose a cable connection in which the ends of the drive cables are terminated in the driven member, there is a limited rotational ability of the driven member. The rotational ability can exceed one or two revolutions but cannot be continuous. There are times when a driven member needs to be rotated many revolutions, or continuously. Accordingly, there is a need for an endless or essentially continuous cable connection between a driving member and the driven member.

It will be noted that at least one end of the cables disclosed in some of the above noted patents are spring terminated to provide tension on the cables. A spring termination directly on the end of each cable is, of course, not possible with an endless cable. Accordingly, different tensioning elements are required for a rotary drive cable system when an endless or essentially continuous cable is being used.

SUMMARY OF THE INVENTION

Among the objects of the invention are the following:

To provide new and useful rotary drive apparatus;

To provide new and useful rotary drive apparatus having an endless or essentially continuous cable coupling together a driving element and a driven element;

To provide new and useful rotary drive apparatus having a driving element and a driven element coupled together by an endless or essentially continuous cable tensioned by a spring loaded pulley;

To provide new and useful rotary drive apparatus having a driving member and a driven member both having generally parallel grooves for receiving an endless or essentially continuous cable; and To provide new and useful rotary drive apparatus having parallel grooves on both the driving member and the driven member and with the grooves offset from each other by one half the distance between the grooves.

These and other objects, features, and advantages will become apparent to those skilled in the art from the following detailed description, when read in conjunction with the accompanying drawings and appended claims.

According to a broad aspect of the invention a rotary drive system is provided in which a driving member and a driven member are disposed adjacent to each other, coupled by a continuous or endless cable. The driving member and the driven member each have sets of parallel grooves. The pitch or separation between the grooves of the driving and driven members are the same, with the groove sets of the two members being offset from each other by half the distance between grooves. The rotary drive system of the invention uses a continuous cable, and provides a different type of tensioning system than disclosed in the above noted patents, which, in one embodiment, includes a spring loaded pulley adjacent the driving member, remote from the driven member, to provide a load on the cable.

According to another broad aspect of the invention, a rotary drive apparatus is provided. The rotary drive apparatus has a drum having a first plurality of generally parallel grooves on the drum spaced a predetermined distance apart. A capstan is disposed adjacent the drum. A second plurality of generally parallel grooves on the capstan are spaced apart the same predetermined distance. The capstan may be disposed adjacent the drum with the grooves on the capstan disposed between the grooves on the drum. The drum and the capstan may have parallel axes of rotation. A continuous cable in the grooves of the drum and the capstan couples the drum and the capstan for joint rotation. A pulley adjacent the capstan and a spring are provided to tension the continuous cable. The axis of rotation of the pulley may be generally perpendicular to the axes of rotation of the drum and the capstan.

According to still another broad aspect of the invention, a method for rotatably positioning a device is presented. The method includes mounting the device to a cylindrically shaped drum, which may have spaced parallel grooves on a peripheral face thereof. A capstan is provided adjacent the drum. The capstan also has spaced parallel grooves on its peripheral face. An endless or essentially continuous cable is wound multiple times alternately in tension between the drum and capstan within the respective grooves for transmitting rotation of the capstan to the drum, and the capstan is rotated to rotate the drum, and thereby position the device mounted to the drum. The cable may be tensioned by providing a pulley about which the cable extends and a spring for biasing the pulley away from the driving member for tensioning the cable. The spring may be connected to be either in compression or tension, to impart the desired tension into the cable.

BRIEF DESCRIPTION OF THE DRAWING

In the various figures of the drawings, like reference numerals are used to denote like parts. Also, the spacing of the grooves in the capstan and drum has been exaggerated for clarity of illustration.

DESCRIPTION OF THE PREFERRED EMBODIMENT

Figure 1:
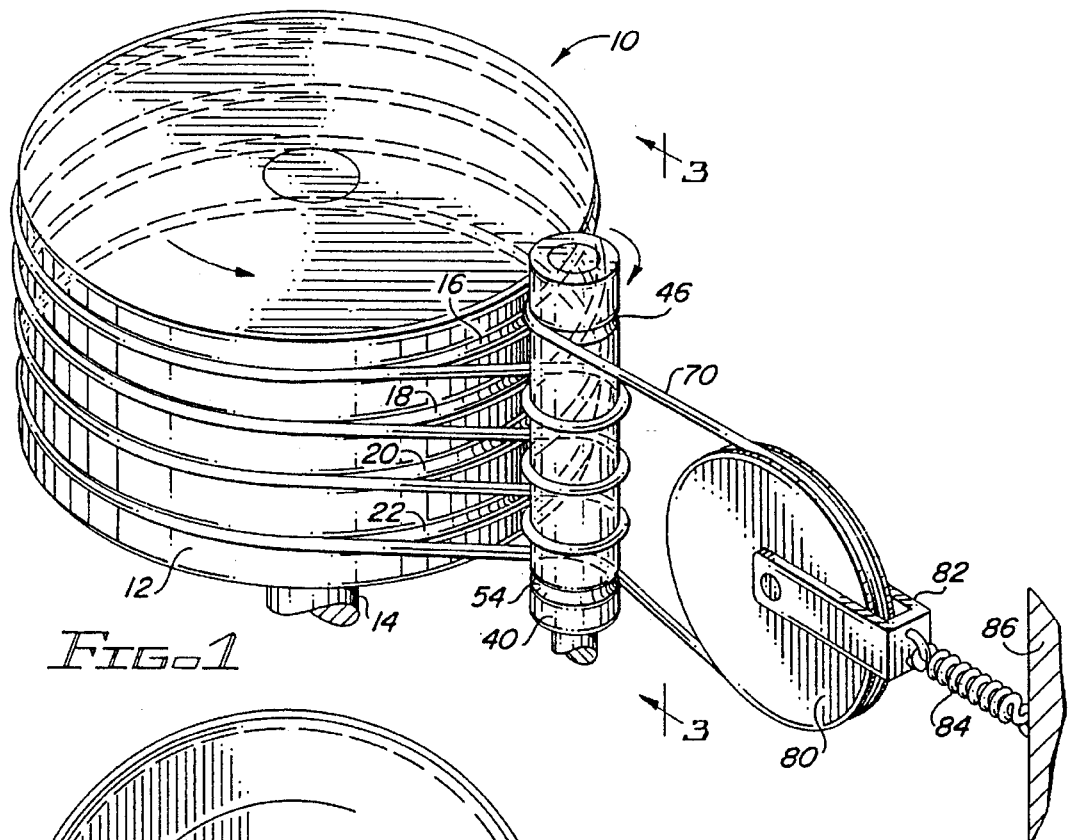
FIG. 1 is a perspective view of the apparatus of the present invention.
Figure 2:
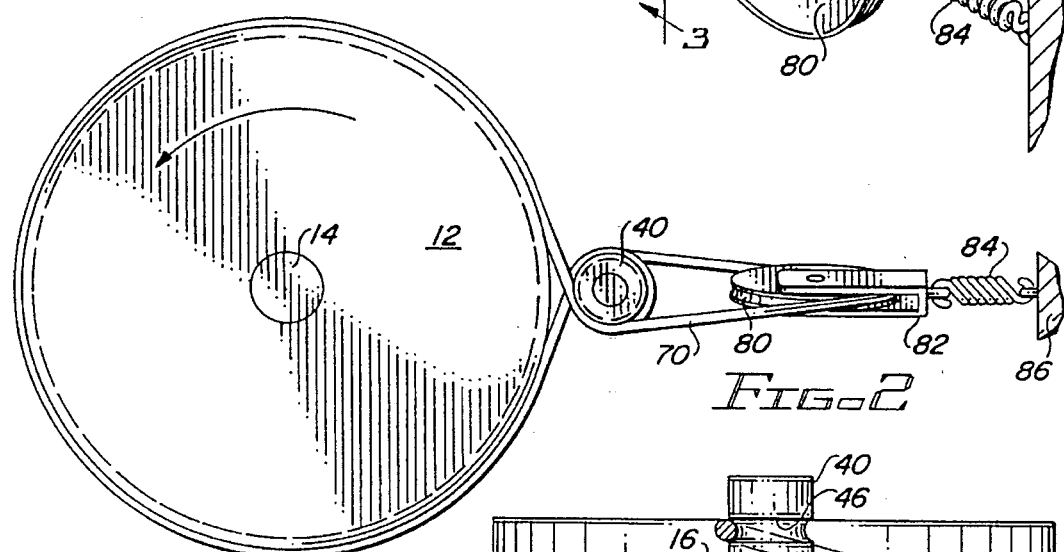
FIG. 2 is a top view of the apparatus of FIG. 1.
Figure 3:
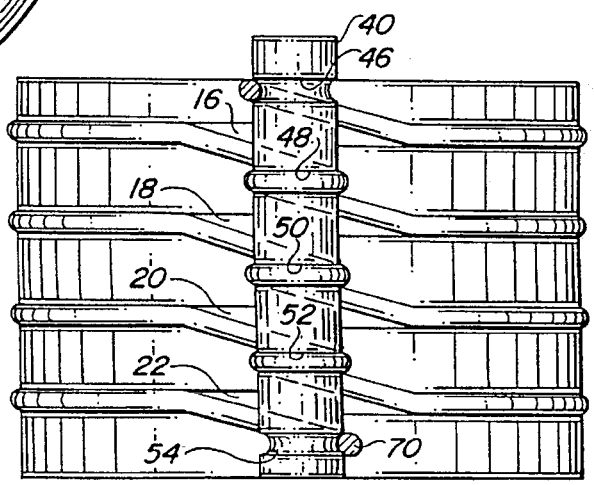
FIG. 3 is a side elevation view taken generally along line 3—3 of FIG. 2.

FIG. 1 is a perspective view of a continuous cable rotary drive apparatus 10 according to the invention. The apparatus 10 includes a drum or driven member 12, a capstan or driving member 40, a cable 70 coupling the members 12 and 40, and a spring loaded pulley 80 for tensioning the cable 70. FIG. 2 is a top view of the apparatus 10 of FIG. 1. FIG. 3 is a side elevation view taken generally along line 3—3 of FIG. 1. For the following discussion, reference will be made to all of the Figures in the drawing.

The rotary drive apparatus 10 includes the drum 12 disposed adjacent a capstan or driving member 40. The drum 12 rotates on a shaft 14 in both clockwise and counterclockwise directions. The drum 12 is a driven member, and rotation of the capstan 40 in either direction results in rotary movement of the drum 12 in the selected direction through the continuous cable 70, which is wound about both the drum 12 and the capstan 40. The cable 70 may be of any convenient construction. For example, the cable 70 may be a single steel cable with a circular cross-sectional shape, as shown. Alternately, the cable 70 may be of any convenient material with any convenient cross-sectional shape. For instance, widely available V-shaped Kevlar or steel reinforced rubber or polyvinyl belts can be used.

Disposed about the drum 12 are a number of parallel grooves, four grooves 16, 18, 20, and 22 being shown in the embodiment illustrated. The number of grooves on the drum and capstan, however, may be as necessary or desired for moving a load (not shown) which may be carried on the drum 12. It will be appreciated that although the provision of grooves in the drum 12 is preferred, depending upon the construction of the elements of the apparatus and its intended application, the grooves 16, 18, 20, and 22 may be omitted. In either case, the axis of the capstan 40 may be canted or tilted with respect to the axis of the drum 12 in order to ensure that the cable 70 entering and leaving the grooves in the capstan do not rub or contact each other, which is their natural tendency. The capstan 40 may also be tilted with respect to the drum 12 to also reduce the amount of twisting or bending motion to which the cable must be subjected to enter or exit the grooves of the capstan 40 so that the entry and exit of the cable 70 can be more smoothly realized. The spacing between the capstan and drum may also be varied to ensure that the entering and exiting cables are not in contact.

The grooves encircle the outer periphery of the drum 12 and are spaced apart a predetermined distance, which is, preferably equal between each pair of grooves. The grooves include a top groove 16, and grooves 18, 20, and 22 spaced apart downwardly from the groove 16 equal distances from each other. The groove 22 is the bottommost or lowest groove.

The capstan 40 also includes a plurality of parallel grooves 46, 48, 50, 52, and 54 along its outer periphery. Again, it may not be necessary in some applications to provide grooves in the capstan 40, depending upon the construction of the elements of the apparatus and the application of the apparatus. If, as shown, grooves are provided both in the capstan 40 and the drum 12, one more groove is provided on the capstan 40 than on the drum 12 to enable complete winding of the cable 70.

The grooves on the capstan 40 include a top groove 46, and grooves 48, 50, 52, and 54 disposed below the groove 46 and spaced apart an equal distance from each other. The spacing between the grooves 16 . . . 22 on the drum 12 is the same as the spacing between the grooves 46 . . . 52 on the capstan 40. However, the grooves on the capstan are offset from the grooves on the drum by one half of the distance between the grooves, as best seen in FIG. 2. The top groove 46 is accordingly disposed above the groove 16 a distance equal to one half the spacing, or half way, between the adjacent grooves 16, 18, and 46, 48, etc.

In the embodiment shown, the pulley 80 is illustrated as being oriented vertically and generally parallel to and aligned with the shaft 14 of the drum 12 and with the capstan 40, which comprise axes of rotation of the drum and capstan. That is, a plane extending through the pulley 80 will extend generally through the center of the capstan 40 and also through the center of the drum 12 and its shaft 14. The pulley 80, however, may be slightly tilted (not shown) to align the cable 70 with the portions of the grooves 46 and 54 to which the cable extends from the pulley.

The pulley 80 includes a groove disposed about its outer periphery. The diameter of the pulley 80, or of its groove, is the same as the distance between the top groove 46 and the bottom groove 54 of the capstan 40. Accordingly, as the cable 70 extends about the pulley 80, it is aligned with both the top groove 46 and the bottom groove 54 by the pulley 80.

A clevis 82 is secured to the pulley 80, and a tension spring 84 is connected between the clevis 82 and an appropriate anchor 86. It will be appreciated that although a tension spring is shown, a compression spring between the pulley and an anchor in the direction of the capstan may be equally advantageously employed.

The purpose of the spring 84 and the pulley 80 is to provide tension for the cable 70. Thus, the tension spring 84 provides a generally constant bias on the pulley 80, and accordingly provides the appropriate tension on the continuous cable 70. The pulley 80 also serves to load the cable 70 to provide a desired magnitude of friction between the cable 70, the drum 12, and the capstan 40. The magnitude of friction between the cable 70, the drum 12, and the capstan 40, of course, transfers the driving force between the capstan 40 and the drum 12. Also, the pulley 80 accommodates wear of the various parts and any stretching of the cable 70.

It will also be appreciated that the cable may be tensioned in other ways. For example, in some applications in which the instantaneous positioning accuracy of the driven member is not of critical concern, the continuous cable itself may be of a material which has elastic properties such that a desired tension can be established and maintained within the cable. Alternatively, one or more idler wheels may be located at various locations along the length of the cable push or pull upon the cable to provide a desired tension within the cable. Such idlers may be, for example, solidly bolted or alternatively journaled to an inertial frame with or without springs or other suitable biasing means. Other suitable ways of providing tension within the cable will be apparent to those skilled in the art.

The cable 70 extends about the pulley 80 and to the top groove 46 of the capstan 40. The cable 70 is then disposed downwardly from the groove 46 around the capstan 40 to the top groove 16 in the drum 12. The cable 70 then is disposed in the groove 16 about the periphery of the drum 12. From the groove 16 the cable 70 extends to the groove 48 on the capstan 40. The cable extends about the capstan 40 in the groove 48 and downwardly from the groove 48 to the groove 18 on the drum 12. The cable then is disposed in the groove 18 about the drum 12. From the groove 18, the cable 70 then drops down into the groove 50 of the capstan 40. From the groove 50 about the capstan 40 the cable 70 extends downwardly into the groove 20 of the drum 12. The cable 70 extends about the drum 12 in the groove 20, and from the groove 20 into the groove 52 on the capstan 40. The cable 70 then extends in the groove 52 about the capstan 40 and from the groove 52 downwardly into the groove 22. From the groove 22 the cable 70 extends back to the capstan 40 and into the groove 54. From the groove 54, the cable 70 extends back to the pulley 80, around the pulley 80, and back to the uppermost groove 46 on the capstan 40.

It will be appreciated that the cable 70 is wound around the drum 12 and capstan 40 multiple times to achieve several important purposes. For example, by virtue of the multiple windings, the drum and capstan assembly can handle much more torque than, for instance, if only a single cable winding were to have been used. Also, multiple windings provides an averaging buffer to variations in the torque between the drum and capstan and to dimensional irregularities of the cable, resulting in smoother operation. In addition, the resulting apparatus is less susceptible to contaminants. If, for example, a contaminating particle were to become lodged between one cable winding and the drum, the overall operation would be less affected than if only a single cable winding were to have been used.

Since the cable 70 is continuous, the rotation of the capstan 40 and of the drum 12 may be continuous in either direction. With a reversible motor (not shown) driving the capstan 40, a load disposed on the drum 12 may be rotated in either direction, as desired, any number of times. The cable 70 is continuous to allow the drum 12 to be rotated in either direction as desired or as required. Since the cable 70 is continuous there is no effective limitation to the degrees of rotation in any direction. Although the term "continuous cable" is used herein, it should be understood that the cable that is used may be effectively continuous over a range of operation in which multiple revolutions of the drum 12 can be effected. Thus, the cable 70 may be endless, as shown, or may be sufficiently long to enable the drum 12 to be rotated any desired number of rotations, for example, six, ten, one hundred rotations, or more. In the event such long cable embodiment is selected, spools, not shown, may be employed as supply and take-up stores for the cable to supply the cable to the capstan 40 and drum 12 on one side, and to take up the cable after it has wound through the capstan 40 and drum 12 on the other side. The pulley 80 and spring 84 are not required in this embodiment; however, it should be understood that in such configuration it is necessary that the supply and take up spools be constructed to provide continuous tension on the cable commensurate with the tension that would have been supplied by the spring 84.

As best shown in FIG. 2, the drum 12 and the capstan 40 are disposed closely adjacent each other. It is, of course, evident that the capstan 40 and drum 12 should be placed as close to each other as possible to maximize the contact area of the cable 70, drum 12, and capstan 40, while minimizing the free distance of the cable 70 between the drum 12 and capstan 40. Accordingly, there is only a slight free distance in the cable 70 between the two members. It follows that the cable 70 is disposed in the respective grooves on the drum 12 and on the shaft 40 for most of the circumferential length of the respective grooves. The offset distance between adjacent grooves on the drum 12 and on the shaft 40 provides a substantially constant distance between the two elements for the cable 70.

The diameters of the drum 12 and the capstan 40 may be as appropriate to produce or provide a desired rotational effect. The greater the ratio, the greater will be the number of revolutions of the capstan 40 to provide a predetermined number of revolutions of the drum 12, and the slower will be the rotational speed of the drum 12 for a predetermined rotational speed of the capstan 40. This is, of course, well known and understood in the art.

Although the embodiment illustrated shows the axis of rotation of the drum 12 as being concentric with the center of the cylinder of the drum, it will be appreciated that the axis of the drum 12 may be offset (not shown) from the geometrical center of the drum. This would provide a eccentric rotational pattern by the drum as it is rotated. Of course, means (not shown) would also need to be provided to move the capstan 40 to maintain its position adjacent to the drum 12 as the drum 12 moves closer and further from the capstan 40 during its rotation.

Although the invention has been described and illustrated with a certain degree of particularity, numerous changes in the combination and arrangement of parts may be resorted to by those skilled in the art without departing from the spirit and scope of the invention, as hereinafter claimed.

I claim:

1. A rotary drive apparatus, comprising:

a drum;

a capstan adjacent said drum, having a plurality of grooves spaced apart by a predetermined distance;

and a continuous cable wound multiple times alternately in tension around said drum and in the grooves of said capstan for coupling said drum and said capstan together for joint rotation.

2. The rotary drive apparatus of claim 1 wherein said drum also has a plurality of grooves spaced the predetermined distance apart and in which said cable is located.

3. The rotary drive apparatus of claim 1 further comprising a pulley about which said continuous cable is also wound and a spring for providing tension on said pulley to create a predetermined tension in said continuous cable.

4. The rotary drive apparatus of claim 3 wherein said spring is a tension spring.

5. The rotary drive apparatus of claim 3 wherein said spring is a compression spring.

6. The rotary drive apparatus of claim 1 in which planes containing the grooves on said capstan are offset from planes containing the grooves on said drum.

7. The rotary drive apparatus of claim 3 in which said pulley is adjacent said capstan.

8. The rotary drive apparatus of claim 3 in which said drum and said capstan have axes of rotation that are parallel.

9. The rotary drive apparatus of claim 8 in which an axis of rotation of said pulley is generally perpendicular to the axes of rotation of said drum and said capstan.

10. The rotary drive apparatus of claim 3 in which said capstan has an axis of rotation that is tilted with respect to an axis of rotation of said drum.

11. The rotary drive apparatus of claim 1 wherein said continuous cable is an endless cable.

12. A rotary drive apparatus, comprising:

a drum, having a plurality of grooves spaced a predetermined distance apart;

a capstan adjacent said drum;

and a continuous cable wound multiple times alternately in tension in the grooves of said drum and around said capstan for coupling said drum and said capstan together for joint rotation.

13. The rotary drive apparatus of claim 12 wherein said capstan also has a plurality of grooves spaced the predetermined distance apart and in which said cable is located.

14. The rotary drive apparatus of claim 12 further comprising a pulley about which said continuous cable is also wound and a spring for providing tension on said pulley to create a predetermined tension in said continuous cable.

15. The rotary drive apparatus of claim 14 wherein said spring is a tension spring.

16. The rotary drive apparatus of claim 14 wherein said spring is a compression spring.

17. The rotary drive apparatus of claim 12 in which said drum and said capstan have axes of rotation that are parallel.

18. The rotary drive apparatus of claim 12 in which said capstan has an axis of rotation that is tilted with respect to an axis of rotation of said drum.

19. The rotary drive apparatus of claim 14 in which an axis of rotation of said pulley is generally perpendicular to the axes of rotation of said drum and said capstan.

20. The rotary drive apparatus of claim 12 wherein said continuous cable is an endless cable.

21. A rotary drive apparatus, comprising:

a cylindrically shaped driven member having spaced parallel grooves on a peripheral face thereof;

a driving member adjacent said driven member, also having spaced parallel grooves on a peripheral face thereof;

and a tensioned continuous cable wound multiple times alternately between the driven and driving members within the respective grooves for transmitting rotation of the driving member to the driven member.

22. The rotary drive apparatus of claim 21 further comprising a pulley about which the cable extends and a spring for biasing the pulley away from the driving member for tensioning the cable.

23. The rotary drive apparatus of claim 22 wherein said spring is a tension spring.

24. The rotary drive apparatus of claim 22 wherein said spring is a compression spring.

25. The rotary drive apparatus of claim 22 in which the drum and the capstan have axes of rotation which are parallel to each other.

26. The rotary drive apparatus of claim 21 in which said capstan has an axis of rotation that is tilted with respect to an axis of rotation of said drum.

27. The rotary drive apparatus of claim 25 in which an axis of rotation of the pulley is generally perpendicular to the axes of rotation of the drum and the capstan.

28. The rotary drive apparatus of claim 25 in which an axis of rotation of said pulley is tilted with respect to a perpendicular direction to the axes of rotation of said drum and said capstan to align said cable with a groove in a circumference of said pulley from which said cable extends from said pulley.

29. The rotary drive apparatus of claim 21 wherein said continuous cable is an endless cable.

30. A method for rotatably positioning a device, comprising:

mounting the device to a cylindrically shaped drum having spaced parallel grooves on a peripheral face thereof;

providing a capstan adjacent said drum, said capstan also having spaced parallel grooves on a peripheral face thereof;

providing a continuous cable that is wound multiple times alternately in tension between the drum and capstan within the respective grooves for transmitting rotation of the capstan to the drum;

and rotating the capstan to rotate the drum and thereby position the device mounted thereto.

31. The method of claim 30 further comprising providing a pulley about which the cable extends and a spring for biasing the pulley away from the driving member for tensioning the cable.

32. The method of claim 31 further comprising connecting said spring in tension between an inertial ground and said pulley.

33. The method of claim 31 further comprising connecting said spring in compression between an inertial ground and said pulley.

34. The method of claim 30 wherein said step of rotating the capstan to rotate the drum comprises rotating the capstan selectively in either a clockwise or a counterclockwise direction.

* * * * *